June 6, 1972  S. L. SNYDER  3,667,705
AUTOMATIC CONTROL SYSTEM FOR PARACHUTES
Filed Jan. 12, 1970  4 Sheets-Sheet 1
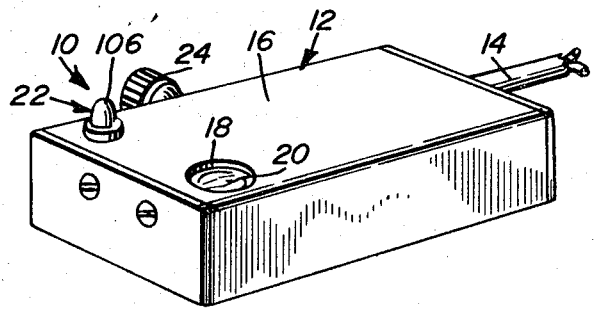
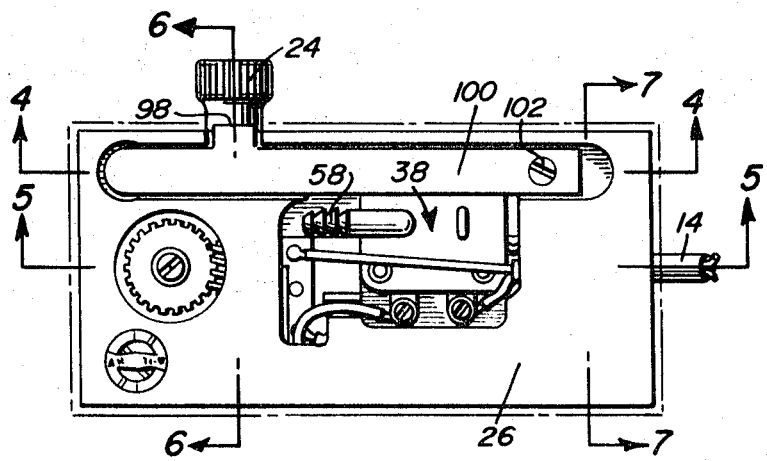
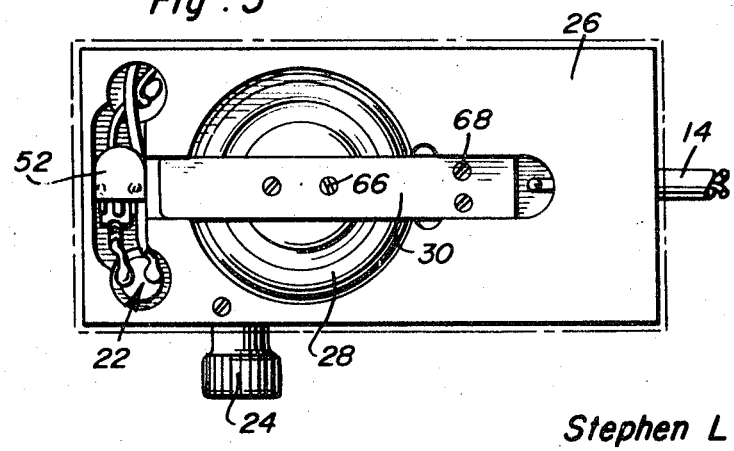
Stephen L. Snyder
INVENTOR.
BY *Clarence A. O'Brien*
and *Harvey B. Jacobson*
Attorneys

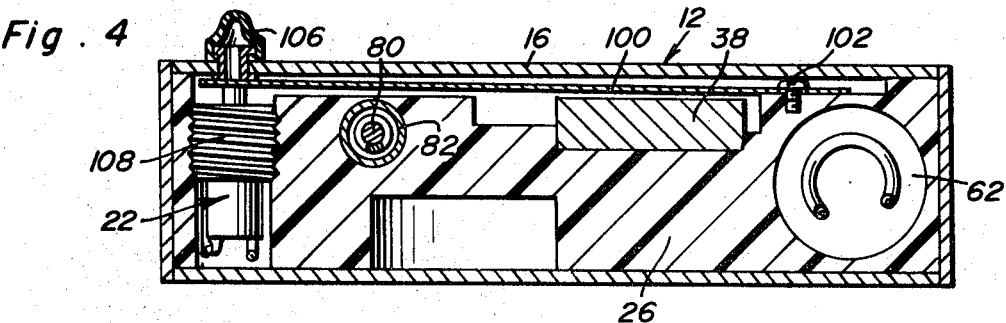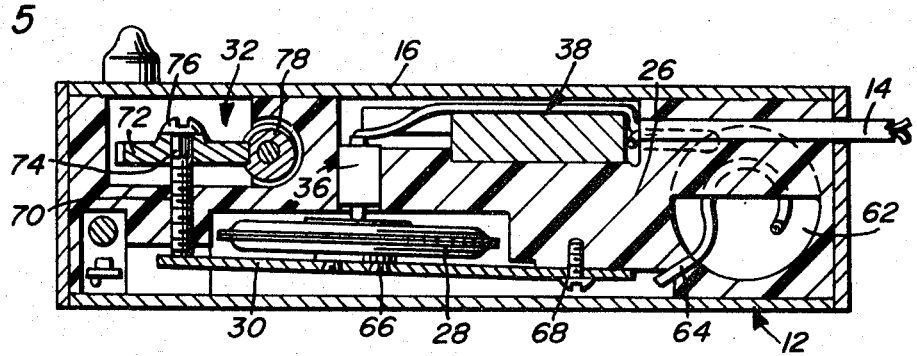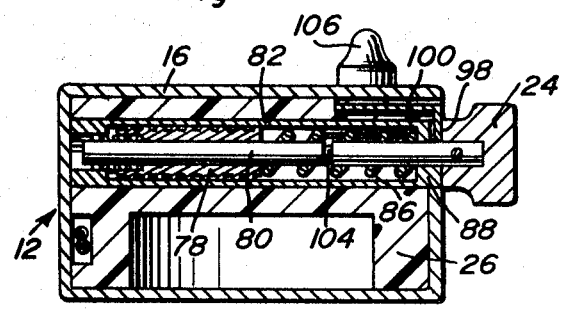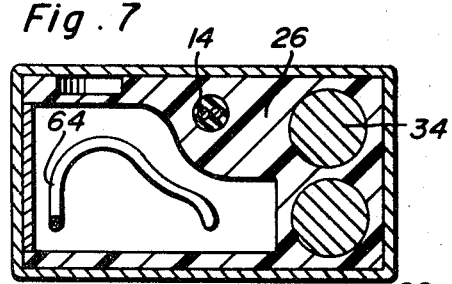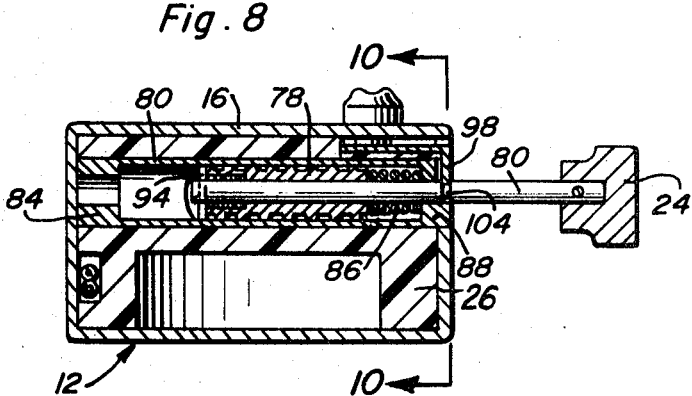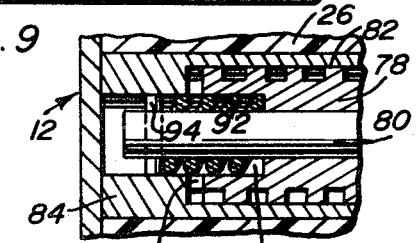

June 6, 1972   S. L. SNYDER   3,667,705
AUTOMATIC CONTROL SYSTEM FOR PARACHUTES
Filed Jan. 12, 1970   4 Sheets-Sheet 3
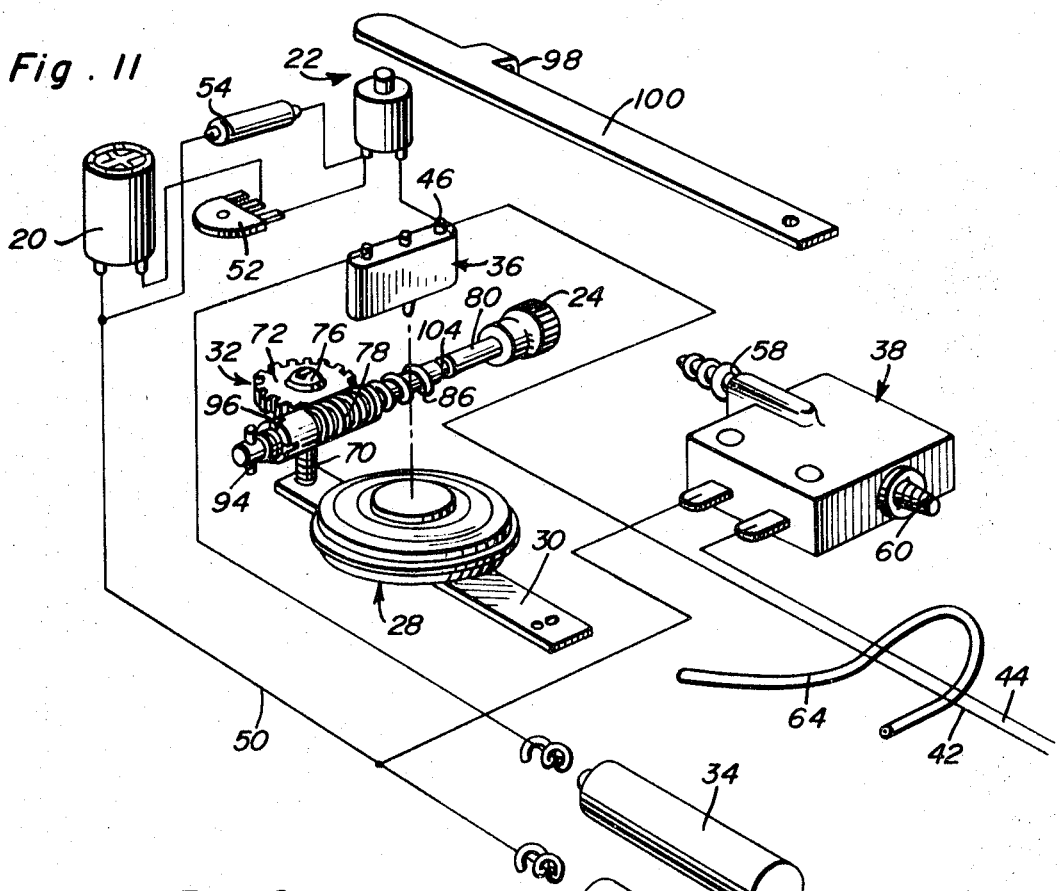
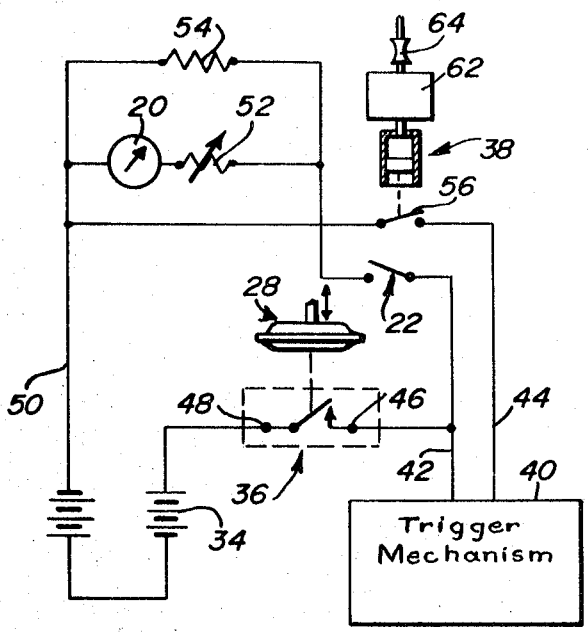
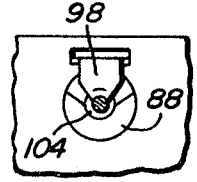
Stephen L. Snyder
INVENTOR.

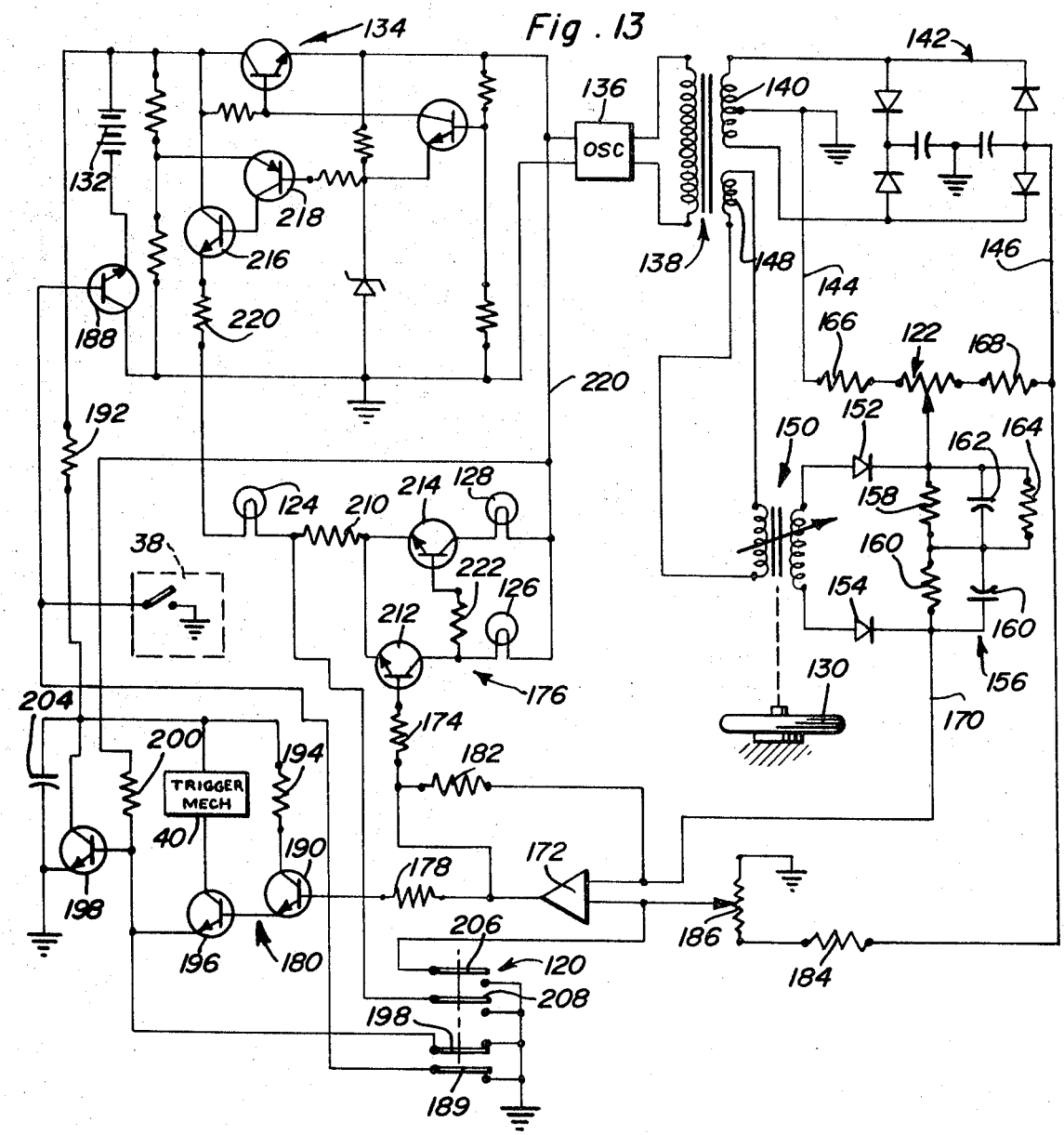

United States Patent Office 3,667,705
Patented June 6, 1972

3,667,705
AUTOMATIC CONTROL SYSTEM FOR
PARACHUTES
Stephen L. Snyder, 331 Cherry Hill Blvd.,
Cherry Hill, N.J. 08034
Filed Jan. 12, 1970, Ser. No. 2,332
Int. Cl. B64d 17/58
U.S. Cl. 244—150                                     25 Claims

ABSTRACT OF THE DISCLOSURE

A differential rate control switch and a barometric control device are jointly operative to trigger a parachute opening mechanism at an elevation preset relative to acutal ground level. The barometric control device determines the altitude at which the parachute is opened if the chutist is falling at a high enough velocity as determined by the rate control switch. The system is readily adjusted for the current barometric pressure at the desired ground level elevation immediately prior to use.

---

This invention relates to automatic control systems for opening parachutes at a predetermined altitude.

Electrically triggered parachute opening devices are well known such as descended in my prior U.S. Pat. No. 3,112,091, which also discloses barometric pressure controlled means for triggering the opening device. However, the system disclosed in this patent fails to automatically take into account the falling velocity of the chutist. A rate control switch for a parachute opening device is disclosed in U.S. Pat. No. 3,300,606 to Starer et al. However, the automatic control system disclosed in the latter patent does not have facilities to establish a nominal distance above actual ground elevation below which the chute must be opened to avoid injury.

It is therefore an important object of the present invention to provide an automatic parachute opening system which will take into account both the falling velocity of the chutist as well as the desirable altitude at which the chute should be opened.

Another problem in connection with automatic parachute opening systems, resides in calibration of the pressure controlling device in accordance with both variations in sea level atmospheric pressure and actual ground level elevation. It is therefore another important object of the present invention to provide a reliable and accurate means for rapidly adjusting the control system so as to compensate for variations in barometric pressure at the acutal ground level elevation.

In accordance with the present invention, a battery source of voltage supplies current to the parachute opening device for triggering the came through a circuit that is jointly controlled by a barometric pressure control device and a rate responsive control switch. The rate responsive control switch insures that there will be no firing of the parachute opening device until the chutist has cleared the airplane by attaining a predetermined velocity. The barometric control device on the other hand automatically completes the circuit to supply current to the parachute opening device when a preset altitude has been reached. The system is adjusted at ground level prior to use by closing of a test switch which disables the triggering circuit and at the same time connects the barometric control device to an indicator circuit so that it may be adjusted in order to compensate for the current atmospheric pressure and the particular ground level above which the chute is to be opened.

In one form of the invention, adjustment of the barometric control device is effected by displacement of a mounting member to which a static pressure sensor is secured. In another form of the invention, adjustment is effected through a current balancing circuit associated with a linear variable differential transformer, the mutual inductance of which is varied by the static pressure sensor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of an automatic control assembly constructed in accordance with the present invention.

FIG. 2 is a top plan view of the control assembly shown in FIG. 1 with the top cover removed.

FIG. 3 is a bottom plan view of the control assembly with the bottom wall removed.

FIG. 4 is a side sectional view taken substantially through a plane indicated by section line 4—4 in FIG. 2.

FIG. 5 is a side sectional view taken substantially through a plane indicated by section line 5—5 in FIG. 2.

FIG. 6 is a transverse sectional view taken substantially through a plane indicated by section line 6—6 in FIG. 2.

FIG. 7 is a transverse sectional view taken substantially through a plane indicated by section line 7—7 in FIG. 2.

FIG. 8 is a transverse sectional view similar to FIG. 6 but showing the control assembly in another operational mode.

FIG. 9 is an enlarged partial sectional view of a portion of the assembly shown in FIG. 6.

FIG. 10 is an enlarged partial sectional view taken substantially through a plane indicated by section line 10—10 in FIG. 8.

FIG. 11 is a perspective view showing some of the disassembled parts associated with the control assembly of FIGS. 1-10.

FIG. 12 is an electrical circuit diagram corresponding to the control system illustrated in FIGS. 1-11.

FIG. 13 is an electrical circuit diagram showing a control system of another form of the invention.

FIG. 14 is a perspective view showing the control assembly of the form corresponding to that of FIG. 13.

Referring now to the drawings in detail, FIG. 1 illustrates an automatic control device or package 10 constructed in accordance with the present invention for supplying a triggering signal to a parachute opening mechanism. The automatic control device is enclosed in a suitable housing generally referred to by reference numeral 12 from which an electrical cable 14 extends to the parachute opening device such as the explosive operated mechanism disclosed in my prior U.S. Pat. No. 3,112,091 aforementioned. The housing is provided with a face 16 having an opening 18 exposing the dial face of a current flow indicating meter 20. Also mounted by the housing and projecting through the face 16, is a push button type of test switch mechanism 22. The automatic control device 10 is adjusted just prior to a jump expedition by means of a control knob 24 projecting from one side of the housing. By means of this control knob, the user may calibrate the device so as to compensate for both the current atmospheric pressure at the particular ground level above which a parachute jump is to be performed.

The housing 12 encloses a mounting block 26 made of a suitable, electrically non-conductive material. The mounting block is provided with a number of cavities and recesses to position and mount the operating components of the automatic control device in proper relation to each other. As shown in FIG. 11, these components include the current flow indicating meter 20 aforementioned, and portions of the test switch mechanism 22. The other components include an aneroid type of barometer 28 secured to an elongated, elastically flexible mounting member 30 which is anchored to the mounting block and adjustable displaced by means of an adjusting gear drive assembly 32 to which the control knob 24 is connected. Electrical energy from which the triggering signal is derived, is supplied by a pair of series connected batteries 34. The triggering signal is produced upon closing of a switch mechanism 36 actuated by the aneroid barometer 28 provided its electrical circuit is conditioned for operation by a differential pressure-type of rate control device 38.

As shown in FIGS. 11 and 12, the components of the automatic control device are interconnected by electric conductors to form a triggering circuit for the trigger mechanism 40 which may be similar to that disclosed in my prior patent aforementioned. The signal output cable 14 extending from the control device 10 therefore encloses a pair of output conductors 42 and 44 respectively connected to the barometer actuated switch mechanism 36 and the electrical contacts 56 associated with the rate responsive control device 38 so that when both the control device 38 and the switch mechanism 36 are actuated, a triggering circuit is completed across the series connected batteries 34.

When the switch contacts of the rate control device 38 are opened, a test circuit may be completed through the switch mechanism 36 upon closing of the test switch mechanism 22 connected to one terminal 46 of the switch mechanism 36, the other terminal 48 of which is connected to one terminal of the batteries 34. The other terminal of the interconnected batteries 34 is connected to the contacts of the rate control device 38 by conductor 50 and to the current flow indicating meter 20. The meter 20 is connected in series with an adjustable resistor 52 to the test switch mechanism 22. Also connected in parallel with the series connected meter 20 and adjustable resistor 52, is a fixed resistor 54. Thus, a test circuit is completed upon closing of the test switch 22 which at the same time disables the triggering circuit. When the test circuit is conditioned for operation by closing of the test switch 22, current flows through the meter 20 upon closing of the barometer actuated switch mechanism 36 so as to provide an indication that this switch mechanism has been closed. Thus, the barometer 28 may be adjusted for actuating the switch mechanism 36 without firing the trigger mechanism. Once proper adjustment of the barometer is made, the test switch 22 is opened restoring the control device 10 to its operational mode requiring closing of both the rate control switch device 38 and the switch mechanism 36 to produce the trigger operating signal.

The rate control device 38 operates to sense the falling rate or velocity of the chutist in accordance with the operating principles disclosed in U.S. Pat. No. 3,300,606 to Starer et al., aforementioned. Briefly summarizing operation of the rate control device 38, the switch contacts 56 as diagrammatically illustrated in FIG. 12 are actuated in response to a difference in pressure between atmosphere, to which the control device 38 is non-restrictively exposed by a high pressure inlet 58 as shown in FIGS. 2 and 11, and a lower pressure to which the device 38 is exposed through a low pressure inlet 60. The low pressure inlet is connected to a plenum chamber 62 as shown in FIG. 5 and as diagrammatically illustrated in FIG. 12. This plenum chamber is formed by a cylindrical cavity within the mounting block 26. The plenum chamber is connnected to atmosphere through a flow restriction 64 in the form of a capillary tube as more clearly seen in FIG. 5. The rate control device 38 is thereby operative in accordance with the principles set forth in U.S. Pat. No. 3,300,606 to prevent operation of the triggering circuit until the chutist has acquired a high enough velocity after jumping in order to avoid premature opening of the parachute.

Once the switch contacts 56 of the rate control device 38 are closed so as to condition the triggering circuit for operation, the triggering circuit will be completed to effect opening of the parachute at a predetermined altitude which is sensed by the barometer 28 thereby closing the switch mechanism 36. As more clearly seen in FIG. 5, the barometer 28 is secured by fasteners 66 to the elastically displaceable mounting strip member 30 anchored adjacent one end to the mounting block 26 by fasteners 68. The other end of the mounting strip member 30 is engaged by the adjusting drive mechanism 32 so that it may be adjustably displaced in order to operatively position the barometer 28 relative to the switch mechanism 36 supported by the mounting block in a fixed position for actuation by the barometer at an altitude corresponding to the ambient air pressure sensed by the barometer 28.

In the embodiment of the invention illustrated in FIGS. 1–12, the adjusting drive mechanism 32 includes an externally threaded screw member 70 which is threadedly mounting block for engagement with the displacing end of the barometer mounting member 30. Accordingly, rotation of the screw member 70 in opposite directions will effect displacement of the mounting member 30 to change the adjusted position of the barometer 28 and the corresponding altitude at which the barometer actuates the switch mechanism 36. As more clearly seen in FIG. 5, a driven worm wheel 72 is non-rotatably secured to the screw member 70 by means of a squared portion 74 thereof adjacent the head 76. The worm wheel 72 is in constant mesh with a worm gear 78 the screw pitch of which is such as to provide a reversible drive. The worm gear 78 is rotatably and slidably mounted on a control shaft 80 and is housed within a tubular casing 82 fixedly carried within the mounting block as more clearly seen in FIGS. 6, 8 and 9. The control shaft 80 extends axially from the tubular casing 82 and is connected to the control knob 24 externally of the housing 12.

The worm gear 78 is adapted to be either axially displaced within the tubular casing 82 or rotated by the control shaft 80 when clutched thereto. Both axial movement and rotational movement of the worm gear is converted by means of the worm wheel 72 in mesh therewith into displacement of the barometer mounting member 30 for adjustment purposes. The worm gear 78 is biased to one axial limit position engaging an internal shoulder formed by the end portion 84 of the tubular casing as shown in FIGS. 6 and 9. The worm gear is biased to this position by a coil spring 86 surrounding the control shaft 80 and reacting between the opposite end portion 88 of the tubular casing and the worm gear. One end of the worm gear is also provided with a recess 90 receiving a smaller coil spring 92 about the control shaft 80 which reacts between the worm gear and a clutch pin 94 secured to the end of the control shaft 80 within the end portion 84 of the gear casing 82. It will be apparent therefore, that the worm gear 78 may be axially displaced from the limit position shown in FIG. 6 against the bias of spring 86 by outward displacement of the control shaft 80 to the position shown in FIG. 8. In outwardly displacing the control shaft, the clutch pin 94 is initially displaced against the bias of spring 92 relative to the worm gear 78 since the coil spring 86 is heavier than the coil spring 92. When the clutch pin 94 engages the worm gear, it is received within an end slot 16 formed therein as shown in FIG. 9 so that the worm gear is not only axially displaced by continued outward movement of the control shaft but will then be clutched to the control shaft for transmitting rotational movement.

The end portion 88 of the gear casing 82 from which the control shaft 80 extends, is provided with a recess receiving a lateral lock tab 98 that projects from an elongated latch element 100 anchored adjacent one end to the mounting block 26 by the fastener 102 as more clearly seen in FIGS. 2 and 4. The lock tab 98 associated with the latch element 100 is adapted to engage a groove 104 in the control shaft 80 so as to hold the control shaft in its extended position as illustrated in FIG. 8. In the extended position of the control shaft, it may be rotated by the user through the control knob 24 in order to transmit adpusting movement to the barometer 28 through the drive mechanism 32. In this fashion, the position of the barometer may be adjusted relative to the switch mechanism 36 so as to just close the same under the current atmospheric pressure. When the latch element 100 is then released from engagement with the control shaft 80, the spring 86 will axially displace the control shaft and the worm gear 78 by a predetermined distance to correspondingly back off the barometer 28 from the switch mechanism 36 a preset distance corresponding to the elevation or altitude at which the switch mechanism 36 will be actuated by the barometer to trigger operation of the parachute opening mechanism. The preset distance by which the control shaft is displaced from its extended position shown in FIG. 8, will of course be determined by the location of the groove 104 thereon. A plurality of appropriately labelled grooves may accordingly be provided on the control shaft so that the user may select different altitudes for which the barometer is to be adjusted.

As hereinbefore indicated, adjustment of the barometer must only be effected during the test mode of the control device 10 so as to avoid unintentional firing of the trigger mechanism. Therefore, the latch element 100 is rendered operative to hold the control shaft 80 in its extended position only when the test switch mechanism 22 is actuated. The latch element 100 is rendered operative to lock the control shaft in its extended position when it is downwardly displaced by the test switch actuator element 106 adapted to be depressed by the user for this purpose and at the same time close the contacts of the test switch mechanism 22 which is fixedly mounted in proper position within the mounting block by means of the threaded fitting 108 as shown in FIG. 4.

To use the automatic control device, it is adjusted by the user at the ground level elevation immediately prior to undertaking a parachute jumping expedition. Adjustment is performed by first depressing the actuator 106 of the test switch mechanism 22 placing the circuit in the test mode so that the condition of the batteries may be monitored by observing the meter 20. At the same time flexing the latch element 100 by the test switch actuator holds the control shaft in its extended position after it is pulled outwardly to the position shown in FIG. 8. In this position of the control shaft, it is clutched to the worm gear 78 so that the control shaft may be rotated in order to finely adjust the position of the barometer 28. The barometer position is adjusted until the switch mechanism 36 is just closed. Closing of the switch mechanism is detected by observing the current flow indicator 20. Once the position of the barometer 28 has been so adjusted by rotational movement of the control shaft, the current atmospheric pressure will have been taken into account. The test switch mechanism may then be released together with the latch element 100 so that the spring 86 displaces the worm gear 78 a preset distance determined by the position of the lock groove 104 on the control shaft in order to reposition the barometer 28 for actuating the switch mechanism 36 at a predetermined lower atmospheric pressure corresponding to the desired altitude above the ground level adjustment made.

FIGS. 13 and 14 illustrate a solid state, electronic form of the automatic control device which is generally referred to by reference numeral 110. The control device 110 may be enclosed by a housing 112 as shown in FIG. 14 from which the output signal cable 114 extends conducing electrical current for firing the trigger mechanism as in the case of the control device 10 hereinbefore described. The housing 112 may be provided adjacent one end with a hinged cover 116 adapted to be opened as shown in FIG. 14 exposing a control panel 118 on which a push button test switch 120 is mounted functionallv similar to the push button test switch mechanism 22 described in connection with the control device 10. Barometer adjustment is effected in the case of the control device 110 through a potentiometer control knob 122. The control device 110 also has a test mode and an operating mode. During the test mode, the condition of the battery source of voltage may be monitored through a battery condition indicating lamp 124 exposed on the control panel 118 adjacent to null indicating lamps 126 and 128 by means of which the operator is able to adinst the device for the current atmospheric pressure.

FIG. 13 illustrates the solid state electronic circuit enclosed within the housing 112 of the control device. The control device housing also encloses an aneroid type barometer 130 with which the control circuit is associated as shown in FIG. 13 and a rate control switch device 38 identical to the rate control device described in connection with the control device 10. Also, the control circuit is associated with the trigger mechanism 40. The barometer 130 is fixedly mounted within the housing 112 of the control device 110 unlike the adjustable mounting described in connection with the control device 10. Instead of adjustably positioning the barometer, atmospheric pressure compensating adjustment is effected through the potentiometer 122.

A battery source of voltage 132 is also enclosed within the housing 112 and connected to a power regulating circuit section 134 from which a constant DC voltage is derived and applied to the input side of an oscillator component 136. A constant oscillating output voltage is accordingly obtained from the output side of the oscillator component 136 which is applied across the primary of a transformer 138. The transformer includes a center tapped secondary winding section 140 connected to the input of a rectifier and filter circuit 142 through which the AC output of the transformer 138 is converted to a relatively low constant DC voltage such as 6-volts applied across the voltage lines 144 and 146. A constant AC voltage is also produced across the secondary winding section 148 of the transformer 138 and fed to the primary winding of a linear variable differential transformer 150.

The transformer 150 has an adjustable transformation ratio which is varied by means of the barometer 130 to which it is operatively connected. The output from the secondary winding of transformer 150 will therefore reflect instantaneous changes in atmospheric pressure or altitude. This signal output voltage is rectified by rectifiers 152 and 154 associated with a balancing circuit 156 which includes a pair of series connected load resistors 158 and 160 across which the rectified output voltage of the transformer 150 is applied. Transient voltages are filtered out by capacitors 160 and 162 connected across the respective resistors 158 and 160 while a temperature compensating resistance device 164 is connected in parallel with the capacitor 162. The rectified output voltage of the transformer 150 is adapted to be balanced by DC input voltage applied through the potentiometer 122 connected in series between the fixed resistors 166 and 168 connected across the constant DC voltage lines 144 and 146. Thus, by positioning the potentiometer 122 during the test mode of the control circuit, the balancing circuit may be adjusted to a null condition wherein no output voltage signal is fed to the output signal line 170.

The output signal line 170 is adapted to supply a negative signal pulse to the input side of an amplifier 172 from which an amplified signal is fed through resistor 174 to a switching circuit 176 and through resistor 178 to a signal gating circuit 180. A signal feedback resistor 182 is connected between the output and input of the amplifier 172 while a positive DC bias voltage is applied to the amplifier from the AC to DC converter 142 through resistor 184 and a grounded bias adjusting potentiometer 186.

In the operating mode of the control circuit, transistor 188 connected to the negative terminal of battery 132 will normaly be in a non-conductive state since its base is connected to the normally opened switch associated with the rate control device 38 and to the normally opened switch section 190 associated with the test switch assembly 120. Since the emitter collector circuit of the transistor 188 is connected in series with the battery 132 no voltage will be applied to the input of the power regulating circuit 134 until the transistor 188 is switched to its conductive state by grounding of its base when the contacts of the rate control device 38 are connected to ground. A constant DC voltage will then be applied to the balancing circuit 156 to produce an output signal when the transformer 150 is adjusted to an appropriate value by the barometer 130 corresponding to an altitude at which the parachute is to be opened. The output signal will then be amplified by the amplifier 172 and fed to the base of transistor 190 in the gating circuit 180. The positive terminal of the battery 132 is connected through resistor 192 to the capacitor 204 for charging the same, to the trigger mechanism 40 and through load resistor 194 to the collector of transistor 190. The emitter of transistor 190 is connected to the base of transistor 196, the emitter of which is connected to ground through the normally closed switch section 198 associated with the test switch assembly 120. Thus, the signal applied to the base of transistor 190 switches the transistor to its conductive state to supply base bias to transistor 196 thereby completing an energizing circuit for the trigger mechanism 40. The capacitor 204 may then discharge through the trigger mechanism for firing the same. The amplified signal conducted through transistor 196 also switches on transistor 198 the base of which is maintained at a proper bias through the bias resistor 200 so as to establish a discharge path for capacitor 204 that was previously charged to a value sufficient to supply the energizing current for the trigger mechanism 40 in order to switch off the gating transistors 190 and 196, after a predetermined period. It will be apparent therefore, that triggering currnet will be suppied to the mechanism 40 for opening the parachute under joint control of the barometer 130 and the rate control device 38.

The control circuit is placed in its test mode by actuating the test switch assembly 120 to its other operative position opening the normally closed switch section 198 so as to disable the gating circuit 180 by opening the circuit for the trigger mechanism. Also, by closing the normally opened switch 189, the base of transistor 188 is grounded so as to switch it to its conductive state and permit the battery to supply voltage to the power regulator component 134. The test switch assembly 120 also includes a normally opened switch 206 which is closed upon actuation of the test switch assembly to ground the bias supply line to the amplifier 172 in order to render it inoperative. The normally opened switch section 208 of the test switch assembly is also closed in order to apply ground to one side of the battery monitoring lamp 124 as well as to apply ground through emitter bias resistor 210 to the emitters associated with transistors 212 and 214 in the indicator circuit 176.

During the test mode, if the battery is in an operating condition, transistor 216 is rendered conductive by bias voltage supplied to its base from the collector of transistor 218 in order to supply current through the voltage reducing resistor 220 to the battery monitoring lamp 124, the circuit of which is completed to ground through the switch section 208. On the other hand, any output signal from the balancing circuit 156 is supplied through output line 170, and resistors 182 and 174 to the base of transistor 212 causing it to switch on in order to complete an energizing circuit through a high null indicator lamp 126 connecting the collector of transistor 212 to the positive output line 220 of the power regulator component 134. When there is no signal in the output signal line 170, the transistor 212 will be non-conductive so as to open the circuit for the lamp 126. Instead, a positive bias is applied from voltage line 220 through resistor 222 conducting sufficient base current so as to switch on the transistor 14 completing an energizing circuit through the low null indicator lamp 128 to ground in series with resistor 210 and switch section 208. Therefore, by observing the lamps 126 and 128, the operator may be able to adjust the balancing circuit 156 through potentiometer 122 in accordance with the current atmospheric pressure being sensed by the barometer 130 at ground level.

To utilize the control device 110, it is placed in its test mode prior to undertaking a parachute jump expedition by actuating the push button test switch assembly 120. The control circuit will then be conditioned to prevent any current supply to the trigger mechanism 40 and at the same time condition the indicator circuit 176 for operation. If the lamp 124 is illuminated, the battery will be in an operating condition. The potentiometer 122 may then be adjusted to a position wherein the lamp 126 is turned off if it is already on in order to set the balancing circuit in a null condition corresponding to the current atmospheric pressure being sensed by the barometer 130. If the indicator lamp 126 is off, the potentiometer 122 is of course adjusted until it comes on and then backed off to turn it off. After this adjustment is made, the user continues to adjust the potentiometer 122 in the same direction until the indicator lamp 128 is illuminated. This position of the potentiometer will correspond to a desired setting for the balancing circuit 156 which would produce a suitable output signal when the barometer 130 senses ambient pressure corresponding to the desired altitude at which the parachute is to be opened with reference to the ground level at which the control circuit was previously adjusted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a parachute control device for producing an output signal, a static pressure sensor connected to said control device, switch means actuated by the sensor for transmitting said output signal when ambient pressure of a fluid medium reaches a preset value, and adjustment means operatively connected to the static pressure sensor for preselecting a reference value of the ambient pressure having a fixed relationship to said preset pressure value, said adjustment means comprising a mounting member to which the pressure sensor is secured, drive means operatively connected to the mounting member for displacement thereof relative to the switch means, and control means operatively connected to the drive means for sequentially displacing the pressure sensor in one direction by a variable amount to an operating position activating the switch means and then displacing the sensor in the other direction to an adjusted position a preset distance from said operating position, said drive means including a driven gear member engageable with the mounting member and a drive gear member in mesh with the driven gear member.

2. The combination of claim 1 wherein said fluid medium is atmospheric air and said ambient pressure is static barometric pressure.

3. The combination of claim 2 wherein said preset value of the ambient pressure corresponds to a nominal altitude and said reference value of the ambient pressure corresponds to a selected ground level elevation with respect to which the altitude is preset.

4. The combination of claim 3 including a parachute opening mechanism triggered by said output signal.

5. The combination of claim 4 including a source of electrical energy connected to said mechanism in series with the control device and the switch means.

6. The combination of claim 5 wherein the control means includes a control shaft axially movable relative to the drive gear member, clutch means engageable in one axial position of the control shaft for converting rotational motion of the control shaft through the gear members into displacement of the mounting member by said variable amount and means responsive to disengagement of the clutch means for converting axial movement of the control shaft through the gear members into displacement of the mounting member by said preset distance.

7. The combination of claim 1 wherein the control means includes a control shaft axially movable relative to the drive gear member, clutch means engageable in one axial position of the control shaft for converting rotational motion of the control shaft through the gear members into displacement of the mounting member by said variable amount and means responsibe to disengagement of the clutch means for converting axial movement of the control shaft through the gear members into displacement of the mounting member by said preset distance.

8. In combination with a parachute control device for producing an output signal, a static pressure sensor connected to said control device, switch means actuated by the sensor for transmitting said output signal when ambient pressure of a fluid medium reaches a preset value, and adjustment means operatively connected to the static pressure sensor for preselecting a reference value of the ambient pressure having a fixed relationship to said preset pressure value, said adjustment means comprising a constant source of voltage rendered operative by the control device, a current balancing circuit operatively connecting the sensor to the switch means, null control means connecting the source of voltage to the current balancing circuit for unbalancing the circuit by a predetermined amount and power coupling means connected to the sensor for transmitting power from the voltage source to the circuit regulated by the sensor to produce said output signal when the circuit is unbalanced.

9. The combination of claim 8 wherein the power coupling means is a linear variable differential transformer.

10. The combination of claim 8 including indicator means connected to the switch means for registering operation of the sensor and test means for simultaneously rendering the indicator means operative and disabling the switch means to prevent development of the output signal.

11. In combination with a parachute control device for producing an output signal, a static pressure sensor connected to said control device, switch means actuated by the sensor for transmitting said output signal when ambient pressure of a fluid medium reaches a preset value, adjustment means operatively connected to the static pressure sensor for preselecting a reference value of the ambient pressure having a fixed relationship to said preset pressure value, indicator means connected to the switch means for registering operation of the sensor and test means for simultaneously rendering the indicator means operative and disabling the switch means to prevent development of the output signal, said adjustment means comprising a mounting member to which the pressure sensor is secured, drive means operatively connected to the mounting member for displacement thereof relative to the switch means, and control means operatively connected to the drive means for sequentially displacing the pressure sensor in one direction by a variable amount to an operating position activating the switch means and then displacing the sensor in the other direction to an adjusted position a preset distance from said operating position.

12. In combination with switch means for transmitting an output signal and a static pressure sensor, means for preselecting an ambient pressure value at which said output signal is generated comprising a source of electrical voltage, a current conducting circuit connecting the switch means to the source of voltage under control of the static pressure sensor, adjustment means for selectively varying the ambient pressure at which the sensor is operative to produce said output signal in the circuit, indicator means connected to the switch means for registering operation of the sensor and test means for rendering the indicator means operative, said circuit including means connected to the test means for preventing development of the output signal when the indicator means is rendered operative.

13. In combination with switch means for transmitting an output signal and a static pressure sensor, means for preselecting an ambient pressure value at which said output signal is generated comprising a source of electrical voltage, a current conducting circuit connecting the switch means to the source of voltage under control of the static pressure sensor, adjustment means for selectively varying the ambient pressure at which the sensor is operative to produce said output signal in the circuit, indicator means connected to the switch means for registering operation of the sensor and test means for rendering the indicator means operative, said adjustment means comprising a mounting member to which the pressure sensor is secured, drive means operatively connected to the mounting member for displacement thereof relative to the switch means, and control means operatively connected to the drive means for sequentially displacing the pressure sensor in one direction by a variable amount to an operating position activating the switch means and then displacing the sensor in the other direction to an adjusted position a preset distance from said operating position.

14. In combination with switch means for transmitting an output signal and a static pressure sensor, means for preselecting an ambient pressure value at which said output signal is generated comprising a source of electrical voltage, a current conducting circuit connecting the switch means to the source of voltage under control of the static pressure sensor, adjustment means for selectively varying the ambient pressure at which the sensor is operative to produce said output signal in the circuit, indicator means connected to the switch means for registering operation of the sensor and test means for rendering the indicator means operative, said adjustment means comprising a current balancing circuit operatively connecting the sensor to the switch means, null control means connecting the source of voltage to the current balancing circuit for unbalancing the circuit by a predetermined amount and power coupling means connected to the sensor for transmitting power from the voltage source to the circuit regulated by the sensor to produce said output signal when the circuit is unbalanced.

15. In combination with a parachute opening mechanism, means for automatically operating said mechanism at a predetermined altitude above ground level comprising a static pressure sensor, switch means connected to the mechanism for transmitting an output signal activating the mechanism, circuit means controlled by the sensor for generating the output signal transmitted by the switch means, adjustment means for selectively conditioning the sensor at ground level to operate at said predetermined altitude, indicator means connected to the switch means for registering operation of the sensor and test means for simultaneously rendering the indicator means operative and disabling the switch means to prevent development of the output signal.

16. In an automatic pressure control system having a pressure sensor and switch means adapted to be activated by the sensor, adjustment means comprising drive means operatively engageable with the sensor for displacement thereof relative to the switch means, control means operatively connected to the drive means for sequentially displacing the pressure sensor in one direction by a variable amount to an operating position activating the switch means and then displacing the sensor in the other direction to an adjusted position a preset distance from said operating position and means for disabling the switch means during said sequential displacement of the sensor to the adjusted position.

17. In an automatic parachute opening system, means for establishing a triggering signal at a predetermined distance above ground level comprising pressure sensing means for producing said triggering signal at an activating elevation that varies with variations in ambient air pressure and calibrating means for adjusting the altitude sensing means in accordance with current ambient air pressure and ground level elevation to obtain said predetermined distance between ground level and activating elevations.

18. The combination of claim 17 including override means for preventing establishment of said triggering signal by the sensing means until a predetermined rate of vertical movement is attained.

19. The combination of claim 17 including disabling means for preventing establishment of said triggering signal by the sensing means.

20. The combination of claim 19 including a source of stored electrical energy from which the triggering signal is derived and means for indicating the level of energy stored in the source while establishment of the triggering signal is prevented by the disabling means.

21. The combination of claim 19 wherein said disabling means is a rate of movement sensor.

22. The combination of claim 17 wherein said calibrating means includes means for initially setting the sensing means to reflect current ambient air pressure at the ground level and means for adjusting the sensing means by a preset amount relative to said initial setting.

23. The combination of claim 17 including rate of movement sensing means for producing said triggering signal when a predetermined velocity is exceeded, and lock-out means for preventing establishment of the triggering signal until both the predetermined velocity is exceeded and the activating elevation is below said predetermined distance above the ground level.

24. In combination with a parachute enclosed within a container, a system for automatically opening said container in response to a triggering signal including a rate sensor, an altitude sensor, control means operatively connected to said sensors for producing said triggering signal in response to a preselected rate of movement and altitude and means connected to the control means for regulating operation of said sensors in accordance with prevailing atmospheric pressure at ground level.

25. In an automatic parachute deployment system, pressure sensing means for determining rate of descent from a predetermined altitude above ground level to a lower preselected altitude, logic means connected to the sensing means for providing an output only when the time interval of free fall between said altitudes is less than a selected period, parachute release means connected to the logic means and activated upon receipt of said output at the preselected altitude and compensating means connected to the logic means for preselecting the lower altitude under prevailing atmospheric pressure conditions at ground level.

References Cited

UNITED STATES PATENTS

| | | | |
|---|---|---|---|
| 3,112,091 | 11/1963 | Snyder | 244—150 |
| 3,243,795 | 3/1966 | O'Brien | 324—29.5 X |
| 3,383,580 | 5/1968 | Wallace, Jr. | 324—29.5 X |
| 3,300,606 | 1/1967 | Starer et al. | 200—83 |
| 3,547,383 | 12/1970 | Carpenter, Jr. | 244—150 |

OTHER REFERENCES

Para-Gear Equip Co., 1968 Mini Catalog, 5138 North Broadway, Chicago, Ill., p. 3.

Parachutist Magazine, P.O. Box 109, Monterey, Calif., March 1971, pp. 18 and 19.

MILTON BUCHLER, Primary Examiner

C. A. RUTLEDGE, Assistant Examiner

U.S. Cl. X.R.

200—83